Patented Oct. 3, 1933

1,929,013

UNITED STATES PATENT OFFICE 1,929,013

ADHESIVE

William Hale Charch, Buffalo, and James E. Snyder, Kenmore, N. Y., assignors to Du Pont Cellophane Company, Inc., New York, N. Y., a corporation of Delaware No Drawing. Application December 31, 1929
Serial No. 417,819

6 Claims. (Cl. 87—17)

This invention relates to adhesives and more particularly to adhesives adapted to be used for the joining or securing of materials formed of or containing a substance not wetted by water, such as, a cellulose derivative, to similar materials or materials wetted by water.

Recently there has appeared on the market a material known as moistureproof cellophane. In one of its modifications this material comprises a sheet or film of regenerated cellulose combined with a moistureproofing composition, the latter preferably being in the form of a thin surface coating. The composition of the surface coating comprises a cellulose derivative, a gum or resin, a wax, and a plasticizer. Moistureproof cellophane, in addition to effectively and successfully resisting the penetration or passage of water vapor therethrough to a substantial degree for a substantial period of time, is flexible, transparent, non-tacky, and non-greasy. By virtue of these characteristics and properties this material has found extensive use as a wrapping tissue, particularly for wrapping articles, which are apt to deteriorate by loss or gain of moisture, and maintaining them in their original fresh state. To attain this result it is desirable that the wrapper completely envelop the article and be sealed.

Moistureproof cellophane has also attained widespread use in the manufacture or production of decorative and ornamental articles. In many of these articles, sheets or films of moistureproof cellophane are secured to or joined to paper, cardboard, cloth or other fabrics, leather, wood or similar materials.

In view of the composition of the surface coating and its thinness, the common available adhesives have been found to be unsatisfactory. Though the known water-soluble adhesive compositions readily wet and render paper, cardboard, fabrics, leather and the like tacky, they do not stick to the surface coating of the moistureproof cellophane.

We have found that a satisfactory adhesive, capable of being used to join or secure materials having surfaces containing a waxy substance and a substance (cellulose derivative, resin or similar material) soluble in an organic solvent, such as, for example, moistureproof cellophane, to similar materials or materials wetted by water can be obtained by mixing or otherwise combining an aqueous adhesive solution (gelatine, casein, etc.) with an adhesive (resin) dissolved in an organic solvent.

It is, therefore, an object of this invention to provide an adhesive which is capable of being used to join or secure materials having surfaces containing a waxy substance and a substance (cellulose derivative, resin or similar material) soluble in an organic solvent, such as, for example, moistureproof cellophane, to similar materials or materials wetted by water.

Another object of this invention is to provide an adhesive composed of a resin or plurality of resins, an organic solvent or solvent mixture for said resin or resins which is also a solvent, a softening or modifying agent for the composition comprising the moistureproof coating, an aqueous adhesive composition containing one or more adhesive materials with or without a softener depending on the hardness of the resins employed.

Other objects will appear from the following description and appended claims.

In accordance with this invention, we have found that a successful adhesive capable of joining or securing materials having surfaces containing a waxy substance and a substance (cellulose derivative, resin or similar material) soluble in an organic solvent, such as, for example, moistureproof cellophane, to similar materials or materials wetted by water may be made by producing a mixture of an aqueous composition containing an adhesive material with an adhesive dissolved in an organic solvent. For example, gums or resins, either natural or synthetic, may be dissolved in appropriate solvents and the solution so formed mixed with an aqueous solution or colloidal mixture of another adhesive. If the resin possesses the desired degree of softness, it is unnecessary to add any ingredient to modify the composition to achieve the desired results. On the other hand, if the resin possesses such a degree of hardness that the resultant composition does not produce a joint having the desired degree of softness or flexibility, a softener may be incorporated in the adhesive composition whereby the desideratum may be obtained. The adhesive produced, as hereinbefore described, forms a joint which is permanent in character and has all of the necessary characteristics of a successful adhesive.

It is apparent that various proportions of the different ingredients constituting the adhesive may be employed. We have found that the following ingredients used in substantially the following proportions (by weight) produce satisfactory results:

|  | Per cent |
|---|---|
| Resin | 5–60 |
| Solvent or solvent mixture | 20–80 |
| Softener | 0–30 |
| Aqueous adhesive composition (5%–50% concentration) | 5–75 |

In order to more clearly illustrate the invention, the following specific example is set forth. It is to be understood that the invention is not limited to this example, but merely serves to illustrate one modification of the invention. The proportions are by weight:

|  | Per cent |
|---|---|
| Gum manila | 22.7 |
| Castor oil | 20.7 |
| Acetone | 23.3 |
| Ethyl acetate | 16.6 |
| Aqueous gelatine solution (20% concentration) | 16.7 |

In producing the above composition, the gum manila is, preferably, dissolved in the acetone and the ethyl acetate and filtered, if necessary. To the solution of the resin is added the castor oil and the resultant mass thoroughly agitated. The aqueous solution of gelatine, separately prepared in the usual manner, is gradually added to the previously prepared mixture and the entire mass thoroughly stirred until a smooth and uniformly dispersed composition is obtained.

It is apparent that a plurality of resins and/or aqueous adhesive compositions may be employed in the final adhesive composition. The following example, wherein the proportions are by weight, illustrates such a composition:

|  | Per cent |
|---|---|
| Gum thus | 16.5 |
| Glyptal resin | 17.9 |
| Acetone | 16.6 |
| Ethyl acetate | 9.0 |
| Castor oil | 8.3 |
| Aqueous gelatine solution (30% concentration) | 14.5 |
| Aqueous casein solution (20% concentration) | 17.2 |

This composition is prepared in a manner similar to that above described. The gum thus and the glyptal resin, the latter being a condensation produce produced from the interaction of phthalic acid and glycerine, are dissolved in the acetone and ethyl acetate and, if necessary, the resultant mixture is filtered. To this solution of resins is added the castor oil. The aqueous solutions of the gelatine and casein which have been previously separately prepared in a well known manner are warmed to a temperature of about 50° C. The resin solution is vigorously stirred and the aqueous gelatine solution gradually added thereto. The casein solution is then added similarly. The mixture is finally agitated vigorously until it is substantially perfectly smooth and uniformly dispersed.

The adhesive compositions constituting a part of this invention and above described are in the form of opaque suspensions or emulsions. The resin or aqueous agglutinant is precipitated or separates when the resin solution and the glue solution come in contact. This separated material immediately becomes suspended or emulsified by the action of the high speed stirrer. The resin and organic solvent may be in the dispersed phase whereas the aqueous solution may constitute the continuous phase or vice versa. The final condition of the composition and the various phases thereof are functions of the relative quantity of the materials employed. If desired, any of the well known emulsifying agents may be employed to effect a more perfect and stable emulsion.

The composition constituting this invention wholly or partially dissolves, wets or otherwise modifies the surface coating of moistureproof cellophane rendering it possible to secure, join or laminate it to other sheets or films of moistureproof cellophane. By virtue of its constituents, the composition also readily wets materials such as paper, cardboard, textiles, leather and the like, and therefore may be used with such materials. Moreover, it is possible to laminate sheets or films of moistureproof cellophane with other dissimilar materials, such as paper, cardboard, leather, etc.

Though the above invention has been described with particular reference to moistureproof cellophane, it is to be understood that this invention is not restricted thereto, since it is obvious that it may be used with other materials having surfaces or coatings normally not wetted by aqueous adhesives, such as, for example, surfaces or coatings formed of cellulose derivatives, resins, etc. alone or in combination with waxy substances.

Since it is obvious that various changes and modifications may be made in the adhesives above set forth without departing from the spirit of the invention, the invention is not restricted to the specific details described except as defined in the appended claims.

We claim:

1. An adhesive to join or secure materials having surfaces containing a substance soluble in an organic solvent to similar materials or materials wetted by water comprising a dispersion consisting of a resin, an organic solvent in which said resin is soluble and which is also a modifying agent for the coating of one of the materials to which it is to be applied, a substance which when mixed with water forms an adhesive, and water, said composition forming a transparent film upon setting.

2. An opaque adhesive composition to join or secure materials having surfaces containing a substance soluble in an organic solvent to similar materials or materials wetted by water comprising a dispersion consisting of a resin, a softener, a solvent for said resin in which said resin is soluble and which is also a modifying agent for the coating of one of the materials to which it is to be applied, a substance which when mixed with water forms an adhesive, and water, said composition forming a transparent film upon setting.

3. An opaque adhesive composition to join or secure materials having surfaces containing a substance soluble in an organic solvent to similar materials or materials wetted by water comprising a dispersion consisting of a plurality of resins, a solvent for said resins in which said resin is soluble and which is also a modifying agent for the coating of one of the materials to which it is to be applied, a plurality of substances which when mixed with water form adhesives, and water, said composition forming a transparent film upon setting.

4. An opaque adhesive composition to join or secure materials having surfaces containing a substance soluble in an organic solvent to similar materials or materials wetted by water comprising a dispersion consisting of the following ingredients in approximately the following proportions and which forms a transparent film upon setting:

| | Per cent |
|---|---|
| Resin | 5–60 |
| Solvent (for resin and coated surface) | 20–80 |
| Softener | 0–30 |
| Aqueous adhesive composition (5%–50% concentration) | 5–75 |

5. An adhesive to join or secure materials having surfaces containing a substance soluble in an organic solvent to similar materials or materials wetted by water consisting of:

| | Per cent |
|---|---|
| Gum manila | 22.7 |
| Castor oil | 20.7 |
| Acetone | 23.3 |
| Ethyl acetate | 16.6 |
| Aqueous gelatine solution (20% concentration) | 16.7 |

6. An adhesive to join or secure materials having surfaces containing a substance soluble in an organic solvent to similar materials or materials wetted by water consisting of:

| | Per cent |
|---|---|
| Gum thus | 16.5 |
| Glyptal resin | 17.9 |
| Acetone | 16.6 |
| Ethyl acetate | 9.0 |
| Castor oil | 8.3 |
| Aqueous gelatine solution (30% concentration) | 14.5 |
| Aqueous casein solution (20% concentration) | 17.2 |

WILLIAM HALE CHARCH.
JAMES E. SNYDER.

CERTIFICATE OF CORRECTION.

Patent No. 1,929,013.     October 3, 1933.

WILLIAM HALE CHARCH, ET AL.

It is hereby certified that error appears in the printed specification of the above numbered patent requiring correction as follows: Page 1, lines 8, 15-16, 29, 33, 43, 49, 61 and 81, page 2, lines 91, 93, 98 and 101-102, for "cellophane" read "CELLOPHANE"; page 2, line 116, claim 1, for "An adhesive" read "An opaque adhesive composition"; and that the said Letters Patent should be read with these corrections therein that the same may conform to the record of the case in the Patent Office.

Signed and sealed this 24th day of October, A. D. 1933.

F. M. Hopkins (Seal)

Acting Commissioner of Patents.

secure materials having surfaces containing a substance soluble in an organic solvent to similar materials or materials wetted by water comprising a dispersion consisting of the following ingredients in approximately the following proportions and which forms a transparent film upon setting:

|   | Per cent |
|---|---|
| Resin | 5–60 |
| Solvent (for resin and coated surface) | 20–80 |
| Softener | 0–30 |
| Aqueous adhesive composition (5%–50% concentration) | 5–75 |

5. An adhesive to join or secure materials having surfaces containing a substance soluble in an organic solvent to similar materials or materials wetted by water consisting of:

|   | Per cent |
|---|---|
| Gum manila | 22.7 |
| Castor oil | 20.7 |
| Acetone | 23.3 |
| Ethyl acetate | 16.6 |
| Aqueous gelatine solution (20% concentration) | 16.7 |

6. An adhesive to join or secure materials having surfaces containing a substance soluble in an organic solvent to similar materials or materials wetted by water consisting of:

|   | Per cent |
|---|---|
| Gum thus | 16.5 |
| Glyptal resin | 17.9 |
| Acetone | 16.6 |
| Ethyl acetate | 9.0 |
| Castor oil | 8.3 |
| Aqueous gelatine solution (30% concentration) | 14.5 |
| Aqueous casein solution (20% concentration) | 17.2 |

WILLIAM HALE CHARCH.
JAMES E. SNYDER.

---

CERTIFICATE OF CORRECTION.

Patent No. 1,929,013.   October 3, 1933.

WILLIAM HALE CHARCH, ET AL.

It is hereby certified that error appears in the printed specification of the above numbered patent requiring correction as follows: Page 1, lines 8, 15-16, 29, 33, 43, 49, 61 and 81, page 2, lines 91, 93, 98 and 101-102, for "cellophane" read "CELLOPHANE"; page 2, line 116, claim 1, for "An adhesive" read "An opaque adhesive composition"; and that the said Letters Patent should be read with these corrections therein that the same may conform to the record of the case in the Patent Office.

Signed and sealed this 24th day of October, A. D. 1933.

F. M. Hopkins (Seal)

Acting Commissioner of Patents.

CERTIFICATE OF CORRECTION.

Patent No. 1,929,013.                                                                       October 3, 1933.

WILLIAM HALE CHARCH, ET AL.

It is hereby certified that error appears in the printed specification of the above numbered patent requiring correction as follows: Page 1, lines 8, 15-16, 29, 33, 43, 49, 61 and 81, page 2, lines 91, 93, 98 and 101-102, for "cellophane" read "CELLOPHANE"; page 2, line 116, claim 1, for "An adhesive" read "An opaque adhesive composition"; and that the said Letters Patent should be read with these corrections therein that the same may conform to the record of the case in the Patent Office.

Signed and sealed this 24th day of October, A. D. 1933.

F. M. Hopkins (Seal)                                                     Acting Commissioner of Patents.